No. 628,855. Patented July 11, 1899.
W. ROWBOTHAM.
GALVANIC BATTERY.
(Application filed Oct. 21, 1895.)
(No Model.) 7 Sheets—Sheet 3.
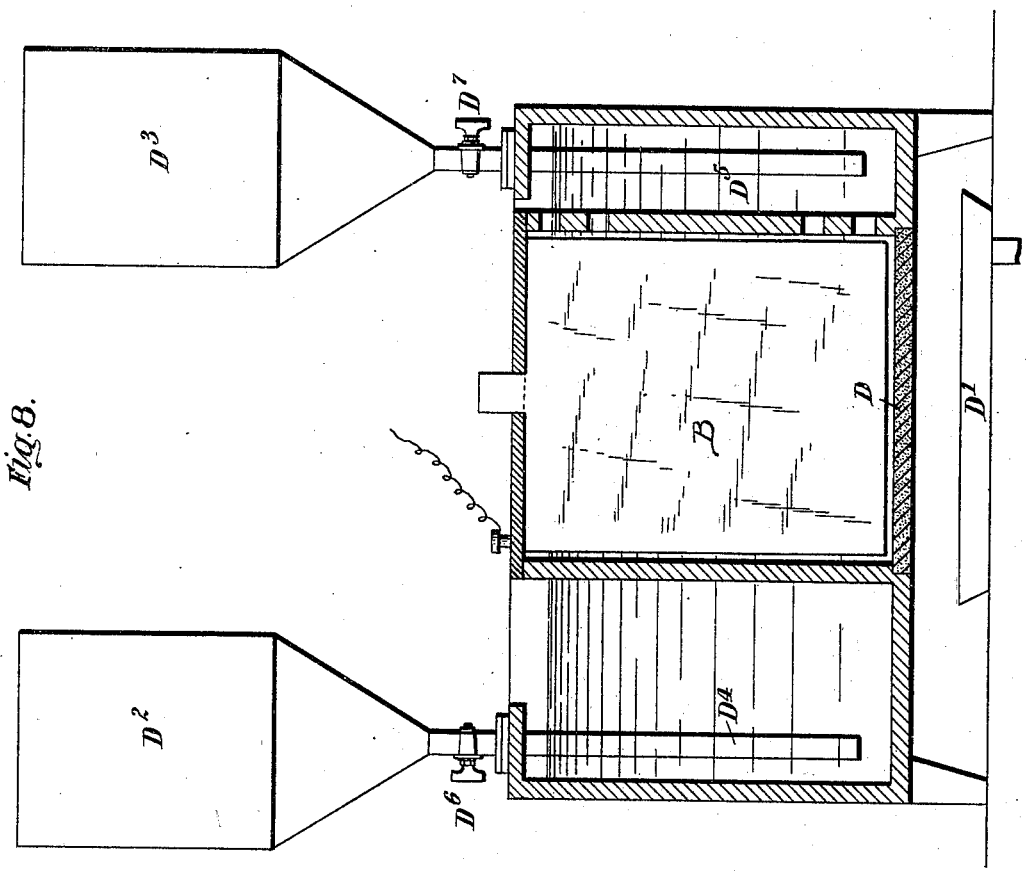
Witnesses
Inventor:
Walter Rowbotham.
By James L. Norris.
Atty.

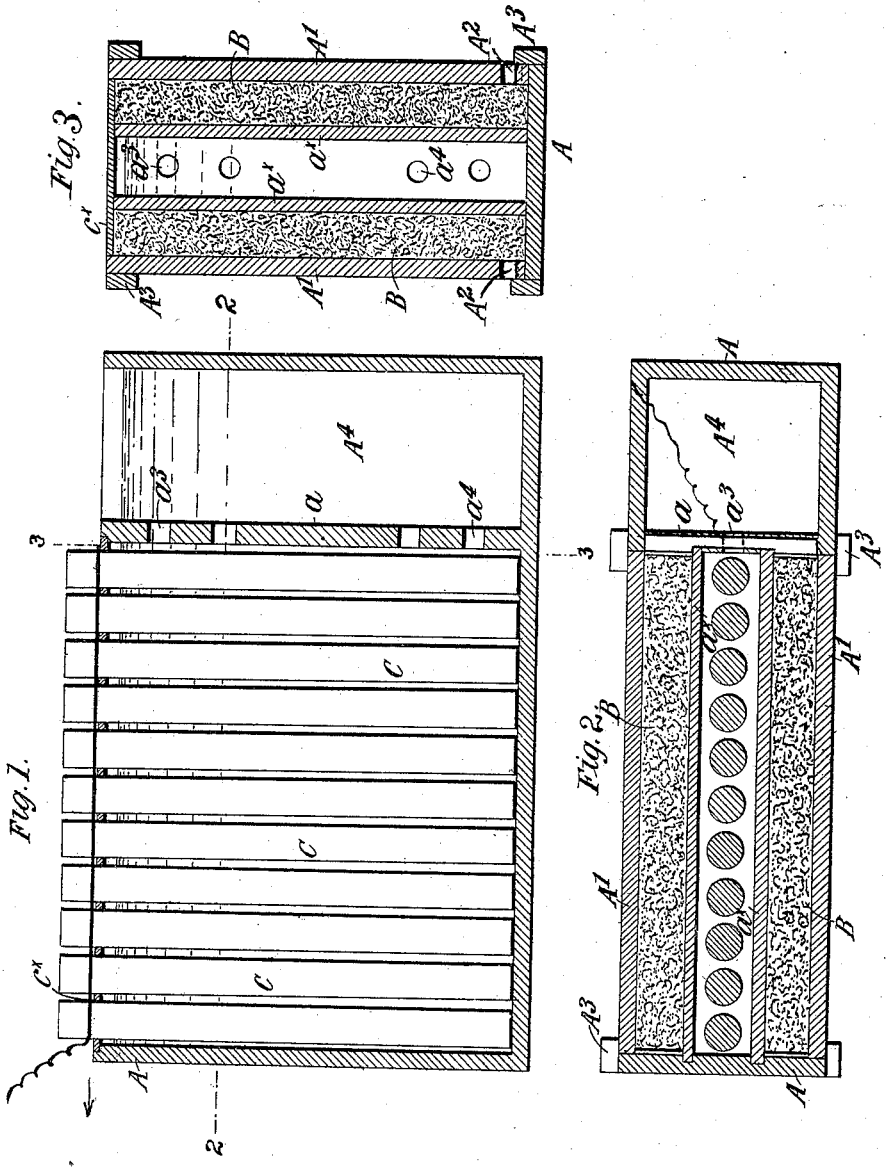

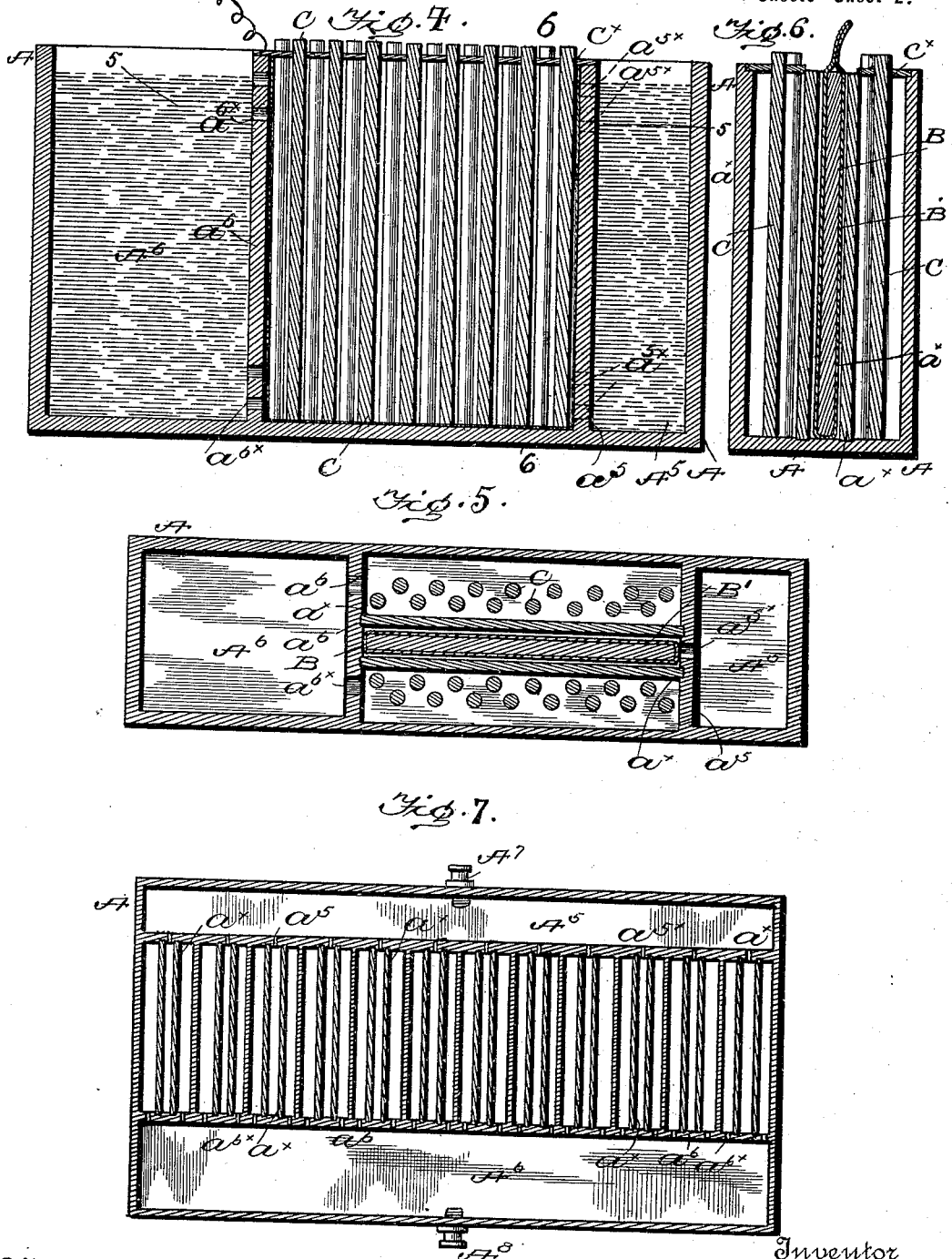

No. 628,855. Patented July 11, 1899.
W. ROWBOTHAM.
GALVANIC BATTERY.
(Application filed Oct. 21, 1895.)

(No Model.) 7 Sheets—Sheet 4.

Witnesses.
Dennis Sumby.
Robert Everett.

Inventor.
Walter Rowbotham.
By James L. Norris.
Atty.

No. 628,855. Patented July 11, 1899.
W. ROWBOTHAM.
GALVANIC BATTERY.
(Application filed Oct. 21, 1895.)
(No Model.) 7 Sheets—Sheet 5.
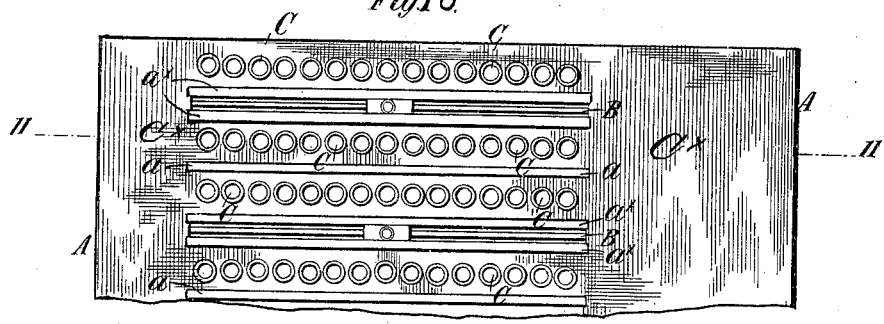
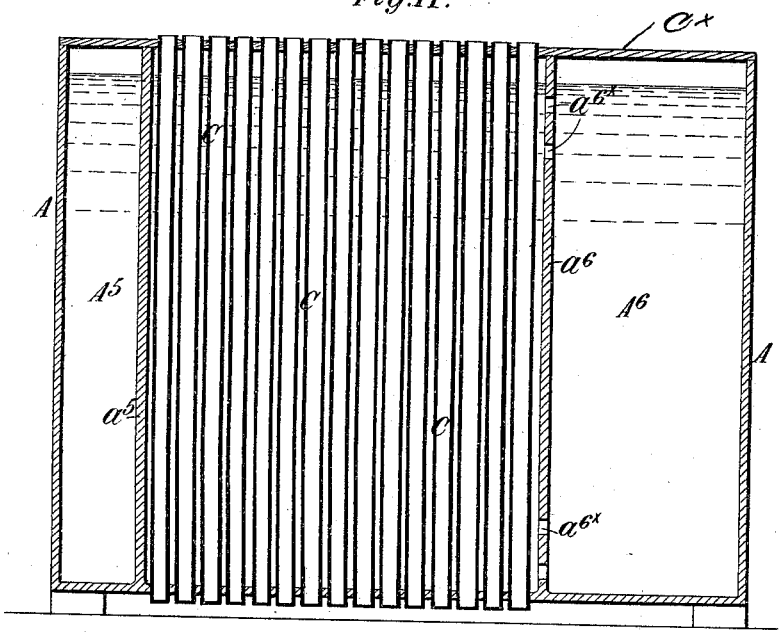

No. 628,855. Patented July 11, 1899.
W. ROWBOTHAM.
GALVANIC BATTERY.
(Application filed Oct. 21, 1895.)
(No Model.) 7 Sheets—Sheet 6.
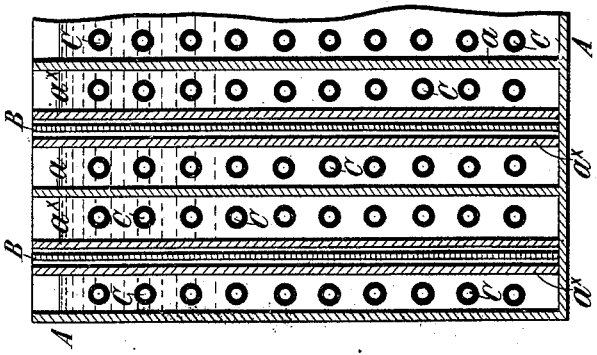
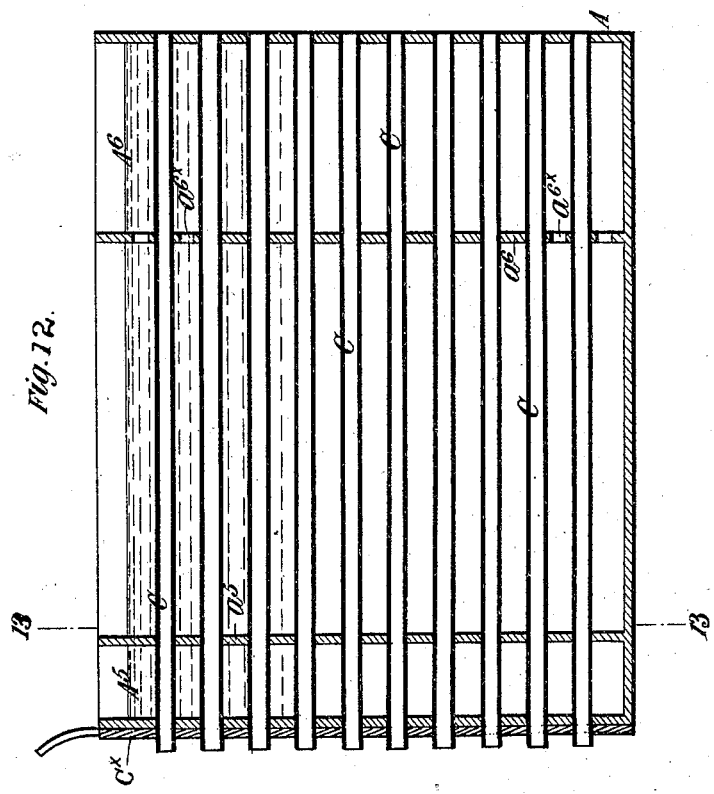

No. 628,855.  
W. ROWBOTHAM.  
GALVANIC BATTERY.  
(Application filed Oct. 21, 1895.)

Patented July 11, 1899.

(No Model.)

7 Sheets—Sheet 7.

UNITED STATES PATENT OFFICE.

WALTER ROWBOTHAM, OF BIRMINGHAM, ENGLAND.

GALVANIC BATTERY.

SPECIFICATION forming part of Letters Patent No. 628,855, dated July 11, 1899.

Application filed October 21, 1895. Serial No. 566,380. (No model.)

*To all whom it may concern:*

Be it known that I, WALTER ROWBOTHAM, electrical engineer, a subject of the Queen of Great Britain, residing at 47 Vittoria street, Birmingham, in the county of Warwick, England, have invented certain new and useful Improvements in and Connected with Galvanic Batteries, of which the following is a specification, reference being had to the accompanying drawings.

This invention relates to primary batteries in which carbon and metal elements are employed.

One of the chief objects of the invention is to so take advantage of the increase of temperature arising in the active portion of the cells when the battery is supplying current that a circulation of the exciting fluid or fluids is produced which greatly assists in preventing polarization. For this purpose I separate the exciting fluid or fluids within the active portion of the cell from the main body of exciting fluid or fluids by means of a partition or partitions having openings near their upper and lower ends. These partitions may consist of the battery elements themselves or may be independent partitions.

Another important object of the invention is to neutralize or oxidize the hydrogen gas that tends to collect on the carbon elements, and thereby still further assist in preventing polarization. For this purpose the carbon elements are formed with passages extending completely through them, the said passages being open to the atmosphere at both ends.

The invention also has reference to various details of construction, as will be hereinafter described.

I also employ specially-prepared exciting fluids, whose components and their proportions will be subsequently set forth.

I will now proceed to describe the invention fully, with reference to the accompanying drawings, which illustrate several forms that the invention may take.

Figure 9:
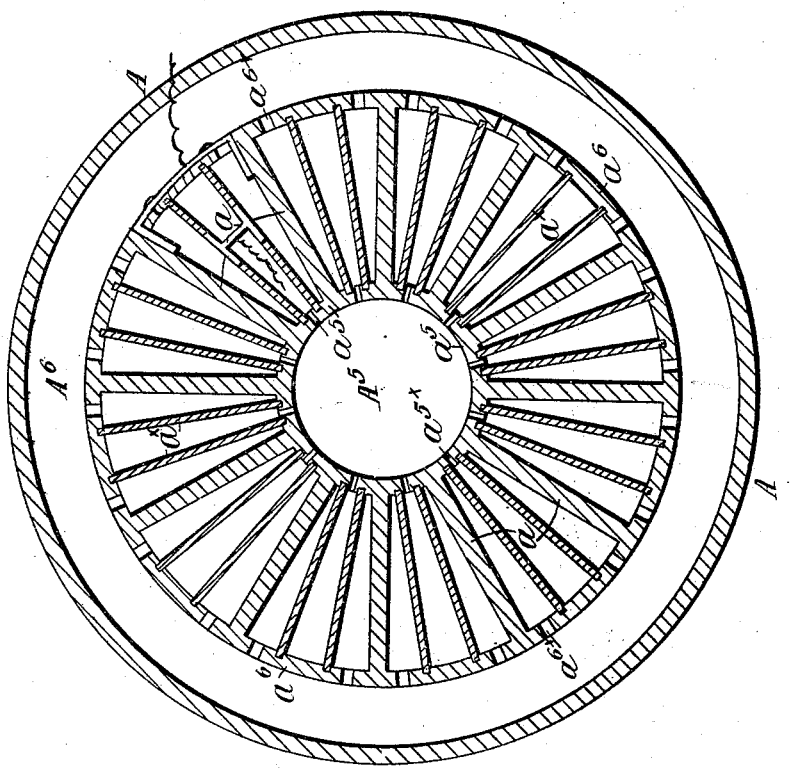
Figure 14:
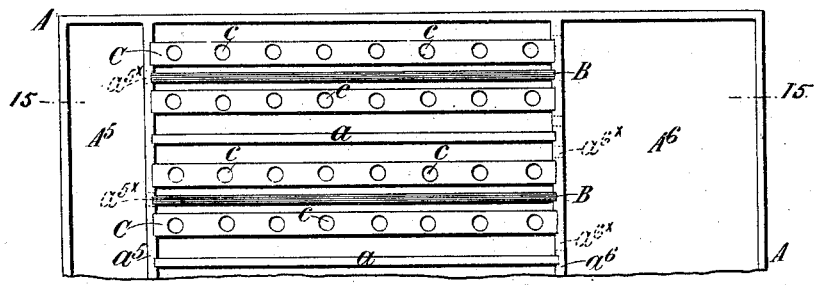

Figures 1 to 3 show one form of single-fluid primary battery provided with means for obtaining circulation, Fig. 1 being a longitudinal section, Fig. 2 a horizontal section on the line 2 2 of Fig. 1, and Fig. 3 a cross-section on the line 3 3 of Fig. 1 as seen from the left. Figs. 4 to 7 show a double-fluid cell provided with means for oxidizing the hydrogen as well as for obtaining circulation of the fluid, Fig. 4 being a longitudinal section, and Fig. 5 a horizontal section on the line 5 5 of Fig. 4. Fig. 6 is a cross-section on the line 6 6 of Fig. 4. Fig. 7 is a horizontal section of a battery of cells of the kind shown in Figs. 1 to 3, the various elements being removed to avoid confusion. Fig. 8 is a vertical longitudinal section of a battery of the kind shown in Figs. 4 to 6, but showing the battery provided with means for enabling the spent fluid to drain off and reservoirs for supplying fresh fluid. Fig. 9 is a plan view of a battery similar to that shown in Fig. 7, but made circular in form. Fig. 10 is a partial plan, and Fig. 11 a transverse section on the line 11 11 of Fig. 10, showing a modified construction of the double-fluid battery. Fig. 12 is a transverse section similar to Fig. 11, and Fig. 13 is a vertical section on the line 13 13 of Fig. 12, showing a further modification of the double-fluid battery. Fig. 14 is a part plan, and Fig. 15 a transverse section on the line 13 13, showing a still further modification of the double-fluid battery.

In all the figures like letters of reference indicate similar parts.

In Figs. 1 and 3 the outer vessel A is divided into two main compartments by a non-porous partition $a$. $a^\times a^\times$ are slabs of porous material dividing one of the said compartments into three subcompartments. B B are the iron elements, which are here shown in the form of turnings, and C C are the carbon elements. The vessel A is in this construction of enameled iron with removable side plates A' A'. The surfaces of these plates are left unenameled where they come in contact with the iron turnings B, so that they serve as current-collectors, and near their lower edges they are formed with a series of perforations $A^2 A^2$ for the spent solution to drain from the iron. In order to facilitate the removal of the aforesaid plates A'', I form the cell with grooved projections $A^3 A^3$, which act as guides and support the plates when they are in position. The before-mentioned partition $a$ is formed with apertures $a^3$ near its upper end and similar apertures $a^4$ near its lower end, all of which open into the subcompartment containing the carbon elements C. These carbon elements are in the form of rods and are connected together at their upper ends by means of a metal current-collecting plate $C^\times$, preferably of copper or brass.

Instead of forming the drainage-perforations $A^2$ in proximity to the lower edges of the side plates $A'$ they may be formed near the upper edges of the said side plates, or they may be formed in the bottom of the subcompartments containing the iron elements.

When the cell has been charged with exciting fluid and is supplying current, the temperature within the subcompartment containing the carbon elements gradually increases, with the result that the warmer portions of the fluid within the subcompartment containing the carbon elements rise to the surface and enter the outer compartment $A^4$ through the apertures $a^3$, their place being taken by the entrance of cooler fluid descending in the said outer compartment $A^4$ and entering through the apertures $a^4$. Circulation of the fluid is thus produced. In addition to this continuous circulation of the fluid within the subcompartment containing the carbon elements and the compartment $A^4$ the solution percolating the porous slabs $a^\times$ gradually finds its way through the iron turnings B and drains through the perforations $A^2$.

The above-described cell may be multiplied in any convenient manner to form a battery.

In Figs. 4 to 7, which show a double-fluid battery, the outer vessel A is divided by nonporous partitions $a^5$ $a^6$ into three main compartments, the inner compartment containing the iron and carbon elements B and C, while the outer compartments $A^5$ $A^6$ contain the main body of the exciting fluids. The inner compartment is divided into three subcompartments by two porous partitions $a^\times$ $a^\times$, which are held in position by grooves formed in the inner surface of the aforesaid partitions $a^5$ $a^6$. These partitions $a^5$ $a^6$ are provided with series of circulation-apertures $a^{5\times}$ $a^{6\times}$, the apertures $a^{5\times}$ establishing communication between the compartment $A^5$ and the subcompartment containing the iron element and the apertures $a^{6\times}$ establishing communication between the compartment $A^6$ and the subcompartments containing the carbon elements. The iron element B is inclosed in a covering or bag of flannel or other suitable material $B'$. I prefer to employ flannel because this material is not much affected by the exciting fluid. The aforesaid bag or covering serves to contain the sulfate-of-iron crystals that are deposited on the iron and enables these crystals to be readily removed by withdrawing the iron element without otherwise interfering with the cell. Moreover, the said bag or covering prevents deposition of the crystals upon the surface and within the pores of the aforesaid porous partitions $a^\times$ $a^\times$, and thereby avoids the increase of the internal resistance of the cell as well as the deleterious effect of these crystals on the porous partitions which would otherwise occur. The circulation of the exciting fluids takes place through the apertures $a^{5\times}$ and $a^{6\times}$ in a similar manner to that already described. The aforesaid compartments $A^5$ $A^6$ may be arranged above the active portion of the cell instead of laterally thereto. In this case the active portion of the cell would be a closed chamber whose subcompartments would be respectively connected by inlet and outlet pipes with the compartments or chambers above.

In combining a number of the above-described cells to form a battery it is preferable to construct the outer or containing vessel A in the manner shown in Fig. 7—that is to say, with only two compartments $A^5$ $A^6$ for the entire number of cells employed. The cells are separated from each other by the partitions $a$. $A^7$ $A^8$ are outlets with which each of these compartments is provided for the purpose of facilitating the drawing off of the spent fluids without shifting the battery. In other respects the battery consists substantially of a multiplication of the cell already described.

Instead of arranging the battery in rectangular form, as shown in Fig. 7, it may be arranged in circular form, as shown in Fig. 9, in which case the cells would be disposed radially, with one of the compartments $A^5$ $A^6$ located centrally and the other circumferentially in relation to the cells.

If the aforesaid apertures in the partitions $a^5$ $a^6$ be not made too large or too plentiful, the resistance of the exciting fluids will be sufficient to prevent any appreciable loss of potential due to the various cells short-circuiting one another through the said fluids.

The active portion of the cell or battery may be furnished with a bottom of porous material D in Fig. 8, through which the spent fluids, which have a tendency to descend, can slowly permeate, and thereby find their way into a receptacle $D'$ provided for them. The porosity of the said bottom must be such that the fluids cannot percolate too quickly and escape before they are sufficiently spent. In order to keep up the supply of the fluids to the battery, reservoirs $D^2$ $D^3$ may be employed for containing the fresh fluids, the said reservoirs being situated above the battery, to which they are connected by means of suitable pipes $D^4$ $D^5$. The inflow of the fresh fluids to the battery from the said reservoirs can be so regulated by taps or cocks $D^6$ $D^7$ as to compensate for the outflow of the spent fluids. In this way the battery would keep itself always properly supplied with exciting fluids.

Figure 15:
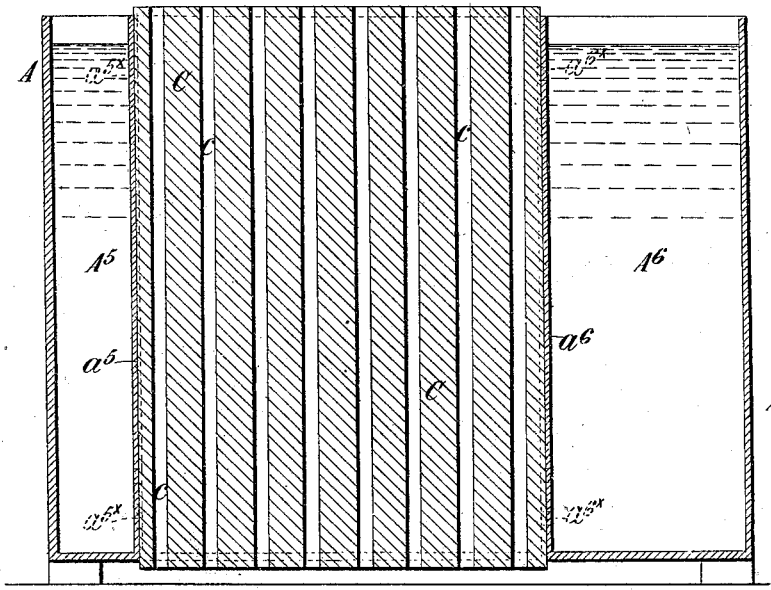

In Figs. 10 to 15 I have shown modified constructions and arrangements of the carbon elements. The carbon elements C are in Figs. 10 and 11 made in the form of tubes and are composed of porous carbon or graphite. These tubes extend through the bottom of the outer vessel A and their upper ends lie above the level of the exciting fluid within the cells. Both ends of the porous carbon tubes are thus fully open to the atmosphere, and in this manner any of the exciting fluid that percolates the pores of the carbon will be able to escape at the lower ends of the tubes. The under side of the battery is provided with feet, so that it is supported a short distance from the surface upon which it rests. Sufficient space is thereby left to permit of a tray or similar receptacle being placed beneath the battery to receive any fluid dripping from the tubes. The carbon of which the tubes C are composed is sufficiently porous to allow the hydrogen-gas bubbles that collect on their exterior surface to permeate the said tubes and come into contact with the air flowing through the interior thereof. When the temperature in the active portion of the cell rises, the air within the carbon elements becomes warmed and ascends, carrying with it any hydrogen gas that enters the tubes, the place of the ascending warm air being taken by the entrance of fresh cool air into the lower ends of the tubes. Although the vertical arrangement of the tubes above described is preferable, I do not confine myself thereto, as they may be arranged in any other position that may be found suitable so long as both their ends are open. For instance, in the modified construction shown in Figs. 12 and 13 the said tubes are arranged horizontally and extend from side to side of the outer cell A, thereby passing completely through the outer or main compartments $A^5$ $A^6$. It will be found more advantageous not to arrange the aforesaid carbon tubes perfectly horizontal, as shown in Figs. 12 and 13, but to give them an inclination, so that the escape of the exciting fluid percolating the porous carbon of which the tubes are composed will be facilitated. The aforesaid tubes are all connected together with a suitable metallic current-collecting plate $C^\times$. In Figs. 14 and 15 the said carbon elements are made in the form of plates, with channels or passages $c$ extending through them from top to bottom, as best seen at Fig. 15. The lower ends of these carbon plates are prolonged through the bottom of the outer vessel, so that the exciting fluid percolating the pores of the carbon elements and entering the said channels or passages $c$ will be able to escape at the lower ends in the manner already explained with reference to the tubular carbons. In this construction of battery I do not employ any porous partitions between the elements. The circulation-apertures $a^{5\times}$ $a^{6\times}$ are arranged as best seen in Fig. 14—that is to say, those in the partition $a^5$ communicate with the spaces on each side of the iron elements B and those in the partition $a^6$ communicate with the spaces on the external sides of the carbon elements C.

The battery solution I prefer to use for the single-fluid batteries consists, essentially, of bichromate or dichromate of soda and dilute sulfuric acid. For the double-fluid batteries the solution for the carbon elements consists, essentially, of bichromate or dichromate of soda and dilute sulfuric acid with or without the addition of nitric acid, and for the iron elements dilute sulfuric acid, to which may be added a small proportion of nitric acid. The proportions of the above-mentioned ingredients may be as follows: In the single-fluid batteries described, with reference to Figs. 1 to 7, bichromate of soda, one part; sulfuric acid, five parts; water, twenty-five parts. In the double-fluid batteries described with reference to the other figures I may employ for the carbon elements bichromate of soda, one part; sulfuric acid, three parts; water, six parts, and for the iron elements sulfuric acid, one part; water, twenty parts, or for the carbon elements bichromate of soda, one part; sulfuric acid, two and one-half parts; nitric acid, one part; water, five parts, and for the iron elements water, twenty-five parts; sulfuric acid, one-half part; nitric acid, one-half part.

The nitric acid in the above-mentioned solution for the carbon elements may be omitted, in which case the solution would be as follows: bichromate of soda, one part; sulfuric acid, two and one-half parts; water, five parts.

The proportions of the sulfuric and nitric acids employed in the solution for the iron elements may be varied, but it is preferable that they should not together exceed one-twentieth of the water. I find that the use of the sulfuric acid and nitric acid considerably mitigates local action in the inner cells—that is to say, in the cells containing the iron elements.

It is to be understood that the above-stated proportions may be varied somewhat and that the solutions are suitable for use in batteries differing from those above described if iron and carbon be employed as the elements.

What I claim is—

1. In a galvanic battery an outer vessel divided by non-porous perforated partitions into three main compartments, the inner one of which constitutes the active portion of the battery, and the outer ones constitute reservoirs for supplying the active portion of the battery with the exciting fluid, metal and carbon elements arranged in said inner compartment, the said perforations in the non-porous partitions being arranged to put all the metal elements in communication with one of the outer compartments and all the carbon elements in communication with the other outer compartment, substantially as described and for the purpose specified.

2. In a galvanic battery, the combination with a battery-cell, of hollow carbon elements passing through the cell and open at their opposite ends to the atmosphere but inaccessible to the electrolyte within the cell, whereby the exciting liquid that percolates the pores of the carbons and enters their interiors can escape by gravity and leave the said interiors free to permit circulation of air through the said carbons, substantially as described.

In testimony whereof I have hereunto set my hand this 4th day of September, 1895.

WALTER ROWBOTHAM.

Witnesses:
 ARTHUR A. BERGIN,
 WM. MELLORSH JACKSON.